Sept. 29, 1959          F. P. HANES          2,906,026

LIQUID LEVEL TELEMETERING DEVICE

Filed March 14, 1957          4 Sheets-Sheet 1

INVENTOR.
Francis P. Hanes
BY

ATTORNEYS

Sept. 29, 1959     F. P. HANES     2,906,026
LIQUID LEVEL TELEMETERING DEVICE
Filed March 14, 1957     4 Sheets-Sheet 2
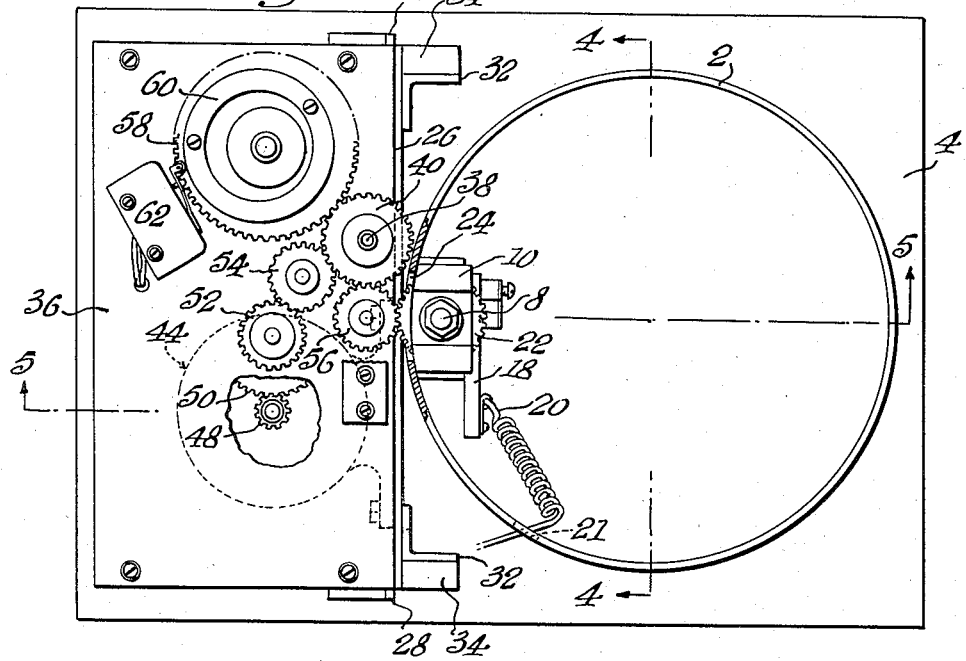
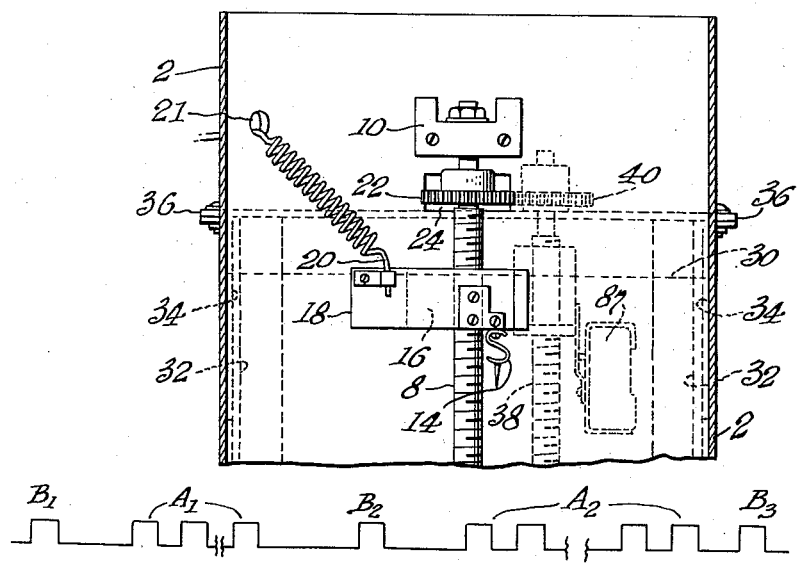
INVENTOR.
Francis P. Hanes
BY
ATTORNEYS Sept. 29, 1959  F. P. HANES  2,906,026
LIQUID LEVEL TELEMETERING DEVICE
Filed March 14, 1957  4 Sheets-Sheet 3

INVENTOR.
Francis P. Hanes
BY

ATTORNEYS

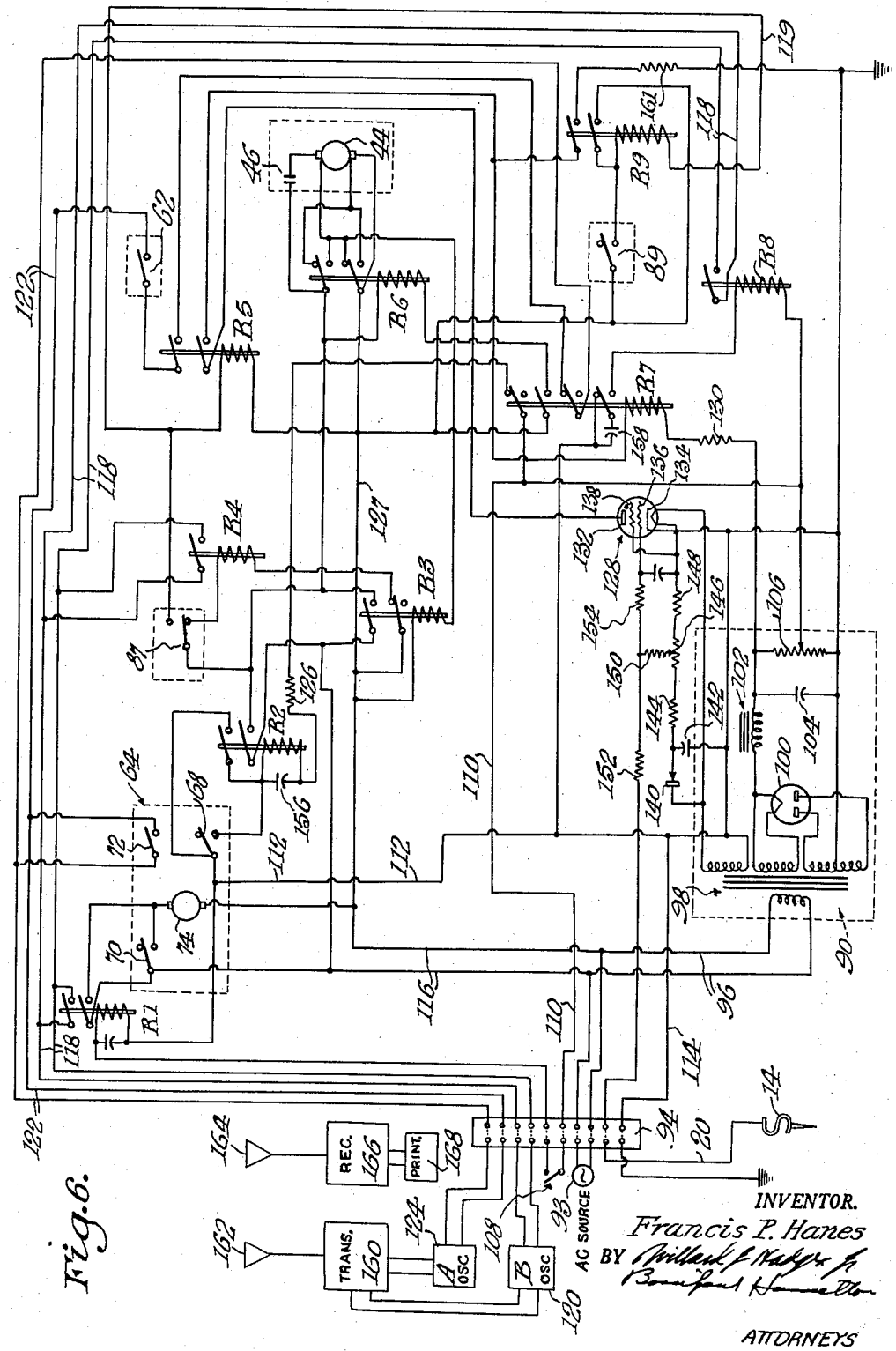

United States Patent Office 2,906,026
Patented Sept. 29, 1959

2,906,026

LIQUID LEVEL TELEMETERING DEVICE

Francis P. Hanes, Vicksburg, Miss., assignor to the United States of America as represented by the Secretary of the Army Application March 14, 1957, Serial No. 646,179

7 Claims. (Cl. 33—126)

(Granted under Title 35, U.S. Code (1952), sec. 266)

The invention herein described may be manufactured and used by or for the Government for governmental purposes without the payment to me of any royalty thereon.

This invention relates to the art of telemetering and more particularly to a system and apparatus for generating signals indicative of liquid levels at a plurality of spaced locations and transmitting them to a central station.

For purposes of flood control, navigation, and weather reporting purposes, it is necessary that the level of lakes, rivers, etc., and the amount of precipitation that will run off into these waters be known to those concerned with these matters. To minimize flood damage and to take advantage of favorable navigational and weather conditions, it is desirable that water levels and amounts of precipitation at a number of spaced points be rapidly and accurately determined and that these measurements be quickly transmitted to a central data gathering location. It is also desirable that these measurements be made automatically and without the necessity of dispatching personnel to the remote areas at which measurements are to be made.

Accordingly, it is an object of the present invention to provide a device for accurately and rapidly measuring liquid levels and transmitting signals indicative of these measurements to a remote receiver.

A further object of the invention is to provide an apparatus of the type described which may be rendered active by a signal from the remote central station whereby power is conserved during periods when no measurements are needed from the apparatus.

It is a further object of the invention to provide a rugged mechanism of the type described requiring no human attendance at its location for its operation.

A further object of the invention is to provide an apparatus of the type described for use in a telemetering system wherein each of a plurality of spaced reporting stations has its own characteristic identification signal which is transmitted to the central station prior to the data signals to prevent confusion between the various stations.

Another object of the invention is to provide a telemetering system wherein two series of pulses are transmitted for each measurement, the first identifying the reporting station and the second series of pulses containing the measurement data.

A further object of the invention is to provide a novel electrical and mechanical arrangement for determining the height of a liquid in a container.

Briefly stated, the instant invention comprises a container for collecting precipitation or for partial immersion in a body of water, the container having a motor-driven exploring probe mounted therein for upward and downward travel. Associated with the motor drive and the probe is a series of cams and switches. These switches are connected to control the operation of a pulse generating circuit. Upon receipt of an interrogating signal from the central station the normally inactive apparatus is supplied with power. A first electric motor is actuated which during its one cycle of operation causes a series of identification pulses to be generated and transmitted. At the termination of its cycle, this first motor causes power to be supplied to the probe-driving motor, which then lowers the probe from its reference position at the top of the container at a uniform rate of speed toward the water surface. During descent of the probe a series of pulses is generated and transmitted, each pulse indicating a predetermined amount of probe travel. When the probe contacts the water surface, pulse transmission ceases and the motor drive is reversed, returning the probe to its reference position. The device is then rendered inactive. By counting the number of pulses and knowing the depth of the container, the liquid level therein may be readily determined.

If the probe completes a predetermined amount of downward travel without encountering the liquid, the pulse generating means is rendered inoperative, the direction of probe travel is reversed and the probe is returned to its reference position.

The operation and advantages of this invention will be better understood from the following detailed description thereof when read in conjunction with the accompanying drawings in which:

Fig. 3 is a plan view of the invention;

Fig. 4 is a partial view of a section taken along line 4—4 of Fig. 3;

Fig. 6 is a diagram showing the electrical circuit of the invention; and

Fig. 7 shows the form of the pulse signals transmitted by the invention.

For the sake of clarity, the electrical connections between the various elements have not been shown in Figs. 1 to 5; it being obvious to one skilled in the art to make these connections in accordance with the circuit shown in Fig. 6.

In Figs. 1 to 5, 2 represents a can or container of convenient depth for collecting the liquid 1 whose level is to be measured. This container is preferably made of a non-corrosive material such as aluminum or galvanized steel, and for rainfall measuring usage may be topped by a standard U.S. Weather Bureau rain receiver (not shown). The container is mounted on base 4 and is provided with a spigot or petcock 6 (Fig. 5) for draining.

Figure 5:
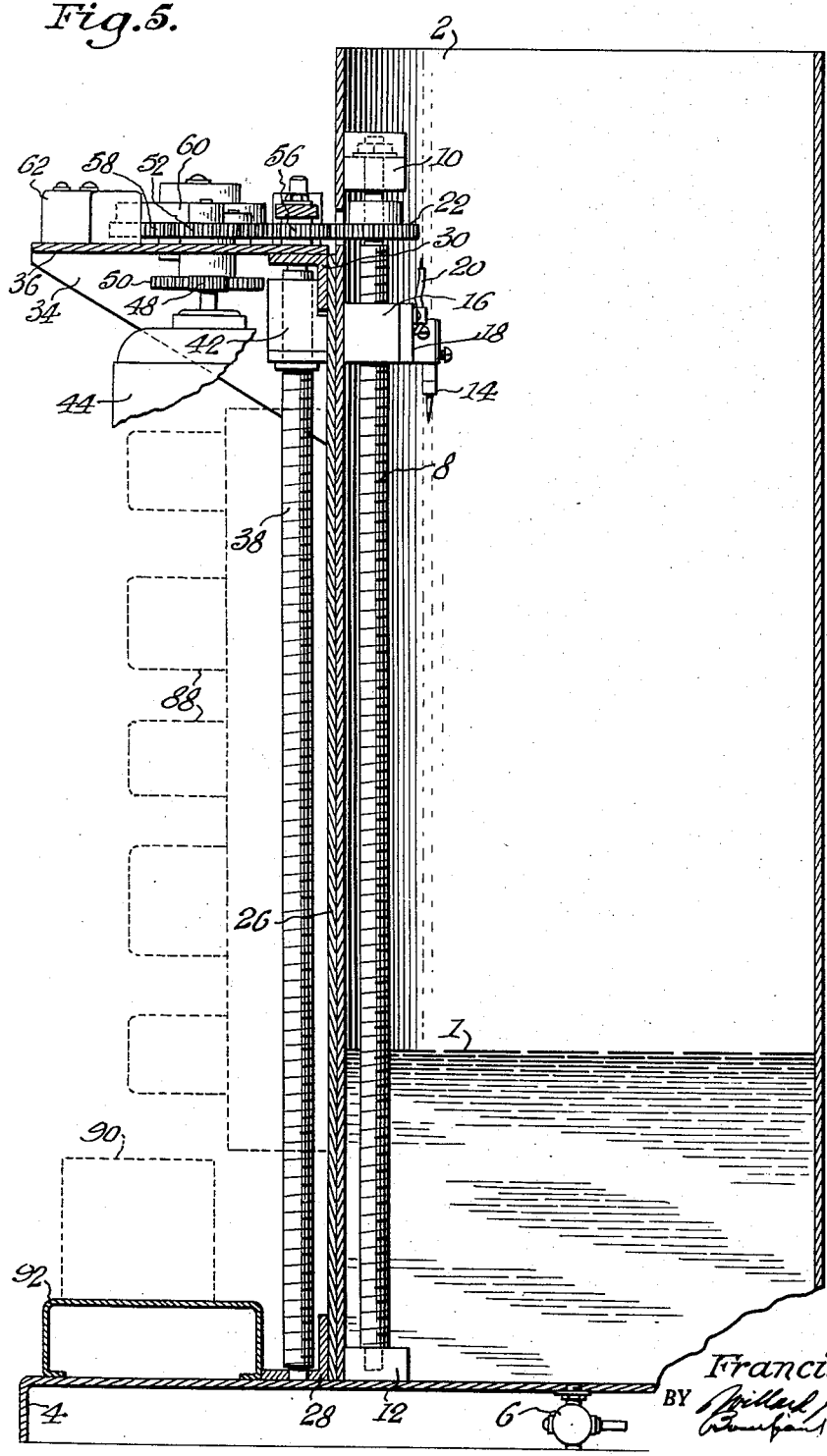
Fig. 5 is a section taken along line 5—5 of Fig. 3.

As shown most clearly in Fig. 5, the probe drive mechanism comprises a threaded shaft 8 mounted vertically within container 2 and adjacent the inner wall. Shaft 8 is journaled in bearings 10 and 12 which are bolted or otherwise fixed to the interior of container 2. Follower nut 16 threadedly engages shaft 8. Probe or contact element 14 is composed of highly conductive material such as silver or copper and is shaped, in the embodiment shown, in the form of a figure S (see Fig. 4) with a slender, pointed element depending therefrom. The particular configuration of probe 14 is immaterial so long as it tapers substantially to a point at its lowest extremity. The probe is secured by suitable fastening elements to a block of insulating material 18 which in turn is fastened to follower nut 16. Lead 20 extends into block 18 to connect with probe 14 interiorly thereof and is brought out of container 2 through aperture 21. Concentrically mounted on shaft 8 near its upper end and rotatable therewith is gear 22 which extends through opening 24 provided in the wall of container 2. The interior wall of container 2 bearing against follower 16 prevents its rotation with shaft 8.

Affixed to the exterior of container 2 is plate 26, which is preferably of the same corrosion resistant material as the container. Angle braces 28 and 30 are secured to the bottom and top respectively of plate 26; brace 28 also being fastened to the base 4. Secured along both vertical edges of plate 26 are angle members 32 (Fig. 3) which in turn support side plates 34. A top member 36 is bolted across the horizontal edges of side plates 34 to form together with plate 26 a support frame for the exteriorly mounted components of the apparatus.

Threaded shaft 38 is mounted parallel to shaft 8 outside of container 2 and is journaled in suitable openings provided in angle braces 28 and 30. Shaft 38 extends through top member 36 and gear 40 is keyed or otherwise fixed to the upper end thereof. Threadedly engaging shaft 38 is follower nut 42, which is prevented from rotating with shaft 38 by bearing against plate 26.

A reversible main drive motor 44 and starting capacitor 46 are bolted to plate 26. Spur-gear 48 on the motor shaft drives gear 50, on the shaft of which and above top member 36 is also mounted gear 52. Gear 40 and driving shaft 38 are driven by gear 52 through idler 54. A second idler gear 56 transmits rotational motion from gear 40 to gear 22 which in turn rotates shaft 8. Gears 22 and 40 are of the same diameter and number of teeth to cause their respective shafts 8 and 38 to revolve at the same speed. Idler 56 functions to effect rotation of shaft 8 in the same direction as shaft 38. The shafts supporting the gears 50, 52, 54 and 56 are supported in bearings suitably provided in top plate 36. It is apparent then, that operation of the drive motor will cause shafts 8 and 38 to revolve in the same direction at the same speed. Shafts 8 and 38 are of the same diameter and have identical threads, resulting in parallel movement of their respective follower nuts 16 and 42.

Also mounted on top plate 36 and meshing with gear 40, is gear 58, on the upper face of which is fastened eccentric ring 60. Ring 60 bears against the movable contact of switch 62, closing the switch once during each revolution of gear 58.

Figure 1:
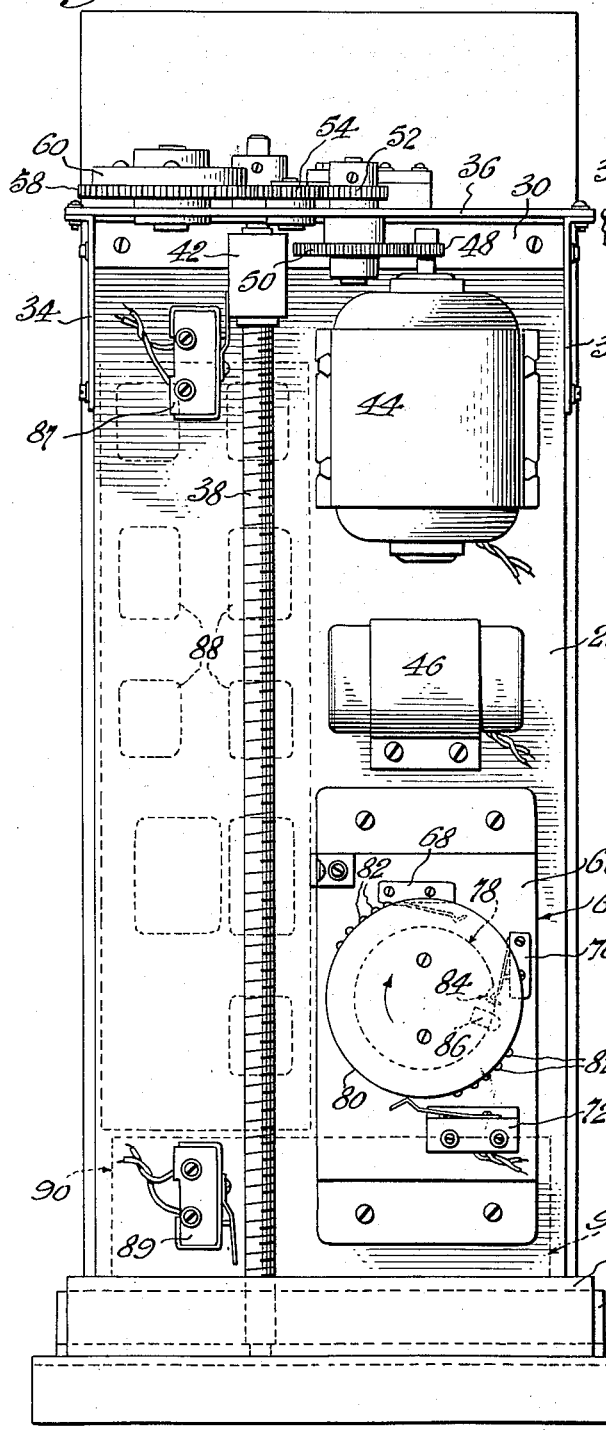
Fig. 1 is a front elevation of the device with the telemetering circuit chassis shown in dotted lines.
Figure 2:
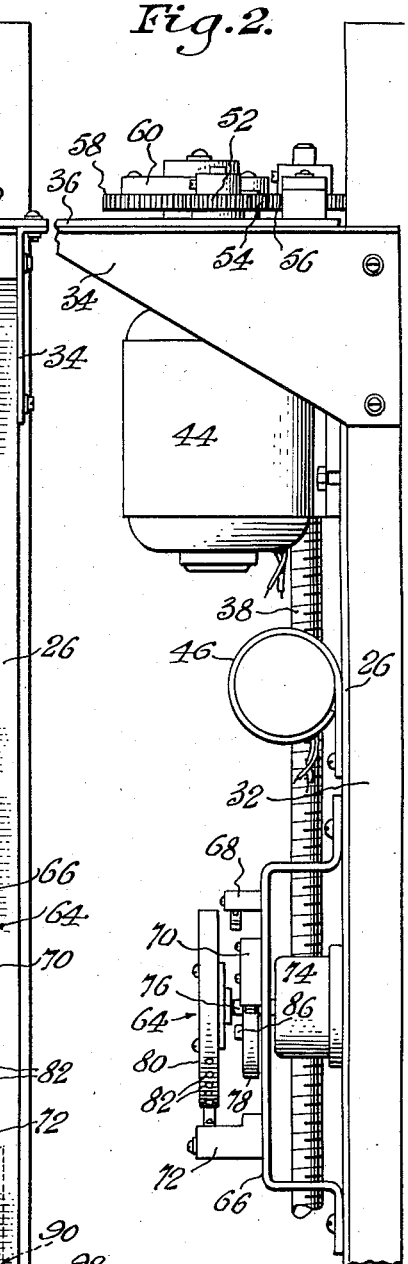
Fig. 2 is a partial side elevation of the structure shown in Fig. 1.

Below capacitor 46 on plate 26 is mounted a cam switching structure, indicated generally at 64 (Figs. 1 and 2). This structure comprises U-shaped support 66 fastened to plate 26 and having switches 68, 70 and 72 mounted thereon. Identification motor 74 is fastened to plate 26 within support 66. The shaft 76 of motor 74 extends through support 66 and cam wheels 78 and 80 are fixedly mounted thereon to be rotated upon operation of the motor.

Cam wheel or code disc 80 has a number of buttons 82 mounted on its periphery arranged to individually actuate switch 72. Cam wheel 78 actuates switch 70 and includes notch 84 in the periphery thereof. Mounted on the surface of cam wheel 78 is member 86 for operating switch 68. Thus, during one clockwise revolution of drive motor 74 the following operations occur: (a) switch 70 remains open for a short initial interval and is closed for the remainder of the revolution; (b) switch 72 is closed a number of times equal to the number of buttons 82 on disc 80; and (c) switch 68 is momentarily closed by member 86 after disc 80 has completed its series of actuations of switch 72.

Upper and lower limit switches, 87 and 89 respectively, are mounted on plate 26 and so disposed with respect to shaft 38 as to have their movable contacts actuated by follower nut 42.

Indicated generally in Figs. 1 and 5 by dotted lines are the telemetering circuit components 88 and the power supply 90 for the equipment. Components 88 are mounted on a chassis in well known manner and fastened to plate 26. Power supply 90 is supported on member 92 affixed to base 4. The entire unit, including the telemetering components and power supply, is preferably housed in a tight fitting, corrosion-resistant cover (not shown) fastened to the base 4.

A preferred embodiment of the electric circuitry of the invention, including telemetering circuit elements 88 and power supply 90, is shown schematically in Fig. 6 and may best be described in terms of its operation in conjunction with the mechanical elements of the device. In Fig. 6, all switches and relays are shown in unoperated position prior to the start of a cycle of operation; follower nuts 16 and 42 being at the top or reference position on their respective shafts.

An alternating current source 93, which may be existing supply mains or a motor-generator set, is connected through terminal board 94, which is preferably fixed to an angle member 32, and conductor pair 96 to power supply 90. Power supply 90 may be of the conventional full wave rectifier type comprising transformer 98, twin diode 100, inductor 102, capacitor 104, and resistor 106 connected in the well-known manner as shown.

Momentary closure of switch 108 connects power to the coil of slow-to-release relay R1 from the center tap of resistor 106, over lead 110, and back to ground through conductors 112, 114. Operation of relay R1 connects alternating current power to identification motor 74 through conductor pair 116 and the lower operated contacts of the relay. Simultaneously, closure of the upper contacts places a short across wire pair 118 to render B oscillator 120 operative, such as by completing its power supply circuit. Oscillator 120, therefore, generates a first pulse $B_1$ (Fig. 7) at a frequency $f_1$ before relay R1 releases. The release of relay R1 is delayed sufficiently to permit approximately five degrees of rotation of identification motor 74, after which switch 70 is closed by cam wheel 78 (Figs. 1, 2) to maintain power at motor 74 for the remainder of its one revolution. During this revolution, buttons 82 on code disc 80 individually actuate switch 72, the resultant shorts placed across lead pair 122 rendering A oscillator 124 operative to generate a series of $A_1$ identification pulses at frequency $f_2$ (see Fig. 7). At the completion of one revolution switch 70 is opened, disconnecting power from motor 74.

After the generation of the series of $A_1$ pulses but before completion of the single revolution of motor 74, member 86 on cam wheel 78 (Figs. 1, 2) momentarily closes switch 68, connecting power to the coil of relay R2 from the center tap of resistor 106, through the uppermost contact of relay R7, resistor 126, and back through conductor 112 to ground. Relay R2 is self-locking over its upper contact and connects power from the alternating current source through lead pair 116 and its lower contact to operate main drive motor 44. At this same instant, slow-to-release relay R4 is supplied with A.C. power through single pole, double throw upper limit switch 87, held in its lower position by follower nut 42 being in its top limit position as shown in Fig. 1, and the normally closed lower contact of relay R3. Operation of relay R4 places a short across lead pair 118 and causes B oscillator to generate a second or $B_2$ pulse.

Operation of drive motor 44 rotates shafts 8 and 38 through the gear arrangement described hereinbefore, causing follower nuts 16 and 42 to begin their descent. After a short length of downward travel of follower nut 42, SPDT upper limit switch 87 is released and completes a circuit to operate relay R5, at the same time releasing relay R4. This circuit may be traced from the A.C. source through lead pair 116, the lower operated contact of relay R2, the now closed upper contact of switch 87, the coil of relay R5, and lead 127.

Eccentric ring 60 is rotated by means of gears 40 and 58 and closes switch 62 once during each revolution. Closure of switch 62 completes a short circuit across lead pair 122 through the upper operated contact of R5 and the normally closed second lowest contact of R7. Therefore, each closure of switch 62 causes A oscillator 124 to generate a pulse at frequency $f_2$. Dependent on the relative proportions of elements 58, 40, and 60, and the pitch of the threads on shafts 8 and 38, switch 62 causes generation of a pulse for each given length of travel of probe 14. It has been found that an arrangement whereby a pulse is produced for every 0.1 inch of travel of the probe provides the degree of accuracy required, although other pulse intervals may be obtained, if desired.

Operation of relay R5 also supplies plate potential for thyratron tube 128, the connection being from the upper terminal of resistor 106, through load resistor 130, the coil of relay R7, and the lower operated contact of relay R5.

Normally non-conducting thyratron 128 comprises a plate 132, cathode 134, control grid 136, and shield grid 138. Cathode 134 and shield grid 138 are tied directly to ground; the tube having a negative control characteristic. Heater current is supplied by the upmost secondary winding of transformer 98. Also connected across this winding is unidirectional conducting device 140, conveniently shown as a crystal diode, and capacitor 142. The resultant current flow through series resistors 144, 146, and 148 provides a potential negative with respect to cathode 134 at the junction of resistors 150 and 146, and thus at grid 136. The junction of resistors 150 and 146 is made variable along resistor 146 to enable adjustment of the negative potential applied to grid 136. Under usual conditions, this potential is set to be sufficiently negative to maintain thyratron 128 in an unoperated condition.

Probe 14 is connected by lead 20 through terminal board 94 and resistors 152 and 154 to control grid 136. The upper terminal of resistor 150 is connected to the common terminals of resistors 152 and 154.

Upon contact of the probe 14 with the surface of the liquid within the container, a circuit is completed through the liquid to the container (ground), causing a flow of current from the probe through resistors 152 and 150. The resultant increase in potential appearing at grid 136 causes thyratron 128 to fire. The current which then flows in the plate circuit of tube 128 operates relay R7.

Upon operation of relay R7, relay R6 is supplied with A.C. power through lead 127, the second uppermost contact of relay R7, and the lower operated contact of relay R2. Operation of relay R6 reverses the direction of operation of main drive motor 44 causing probe 14 to be lifted from the liquid surface. As is well known, the control grid of a thyratron loses control once conduction across the tube has started and conduction will continue until the plate circuit is opened. Thus relay R7 remains operated after probe 14 is no longer in contact with the liquid.

Operation of relay R7 also causes its second lowest contact to open the short circuit across lead pair 122 and thus stop generation of $A_2$ pulses by oscillator 124.

At the time R6 is energized, R3 is also actuated through the connection made in the drive motor reversing circuit and the lower contact of R2. Opening of the upmost contact of relay R7 upon its operation de-energizes relay R2, however capacitor 156 delays release of the contacts of R2 for a time sufficient to enable R3 to operate and maintain the alternating current power supply to the main drive motor 44 through its upper contact. Energization of relay R3 also opens its lower contact which breaks the energization circuit of relay R4. This prevents generation of a spurious B pulse which would otherwise occur upon restoration of the upper limit switch 87 at the end of the cycle.

Closure of the bottom contact of relay R7 energizes relay R8 and thus places a short circuit across lead pair 118 to generate a $B_3$ pulse at frequency $f_1$. The length of this pulse is determined by the size of capacitor 158.

When the now reversed motor drive has returned the follower nuts to their reference or topmost position, switch 87 is returned to its lower contact by follower nut 42. The power circuit for relay R5 is thereby opened, permitting the relay to de-energize and release its contacts. Opening of the lower contact of R5 breaks the plate circuit of thyratron 128 causing the tube to deionize and cease conducting. Relay R7 then is de-energized.

Release of the second upmost contact of relay R7 removes power from the coil of relay R6, releasing the contacts of the latter relay to their unoperated upper position. During the change of position of the contacts of relay R6, the power circuit to relay R3 is broken for a sufficient length of time for the latter to deenergize and release its contacts. This in turn breaks the power supply circuit to drive motor 44. It will be seen that all relays and switches have now been returned to their positions shown in Fig. 6 ready to commence another cycle of operation.

Lower limit switch 89 provides for return of the probe in the event no liquid is in the container or upon failure of the probe return circuit previously described. Assuming the probe being driven downward by motor 44, relays R2 and R5 in energized condition, and switch 62 being closed once each revolution of eccentric ring 60 to transmit $A_2$ pulses, closure of lower limit switch 89 by follower nut 42 at the lower limit of travel of probe 14 operates relay R9. The energization circuit may be traced from the A.C. source through lead 127, switch 89 coil of relay R9 lead 119 upper closed contact of switch 87 and the lower closed contact of relay R2. Relay R9 is self-locking over its lower contact. Closure of the upper contact of R9 completes a circuit from the upper terminal of resistor 106 through resistor 130, the coil of relay R7, resistor 161 and ground. The resultant current flow actuates relay R7 to initiate the same sequence of operations caused by the firing of thyratron tube 128, described above.

To transmit the pulses generated by the apparatus, there is shown, merely as an example, a radio transmitter 160 having an antenna 162 and transmitting preferably in the 169–171 mc. hydrologic band. Oscillators 120 and 124 are connected to modulate the transmitted carrier wave in accordance with the pulses generated. Cooperating receiver antenna 164 and receiver 166 at the central station pick up and demodulate the signals transmitted from all reporting stations and feed the detected pulses to recorder or standard, commercially available counter-printer means 168, where a permanent record of the information is made. Although not shown, it is apparent that the pulse signals may be transmitted over wire lines, such as existing telephone circuits, as well as by radio.

Referring now to Fig. 7, the $B_1$ pulse transmitted upon initiation of the measurement cycle readies the counter-printer means 168 to receive a quantity of $A_1$ pulses by which the transmitting station is identified. The $B_2$ pulse sets up the counter-printer to receive a quantity of $A_2$ pulses, each representing a predetermined length of downward travel of the probe 14 in the container 2. When the probe 14 contacts liquid in the container or reaches its lower limit of travel, the $B_3$ pulse is transmitted which causes the counter-printer to print the stored information and reset so as to be ready for another cycle of operation similar to that described above. The water level may be easily determined by multiplying the number of $A_2$ pulses by the length each pulse represents and subtracting the product from the known height of container 2.

The apparatus is particularly suited for remote interrogation whereby no personnel are required at the telemetering site. A transmitter at the central recording station transmits selective audio tones to receivers placed at each measurement station. The received tone energizes a relay to switch on the A.C. supply for the measuring device and through another relay closes switch 108 to initiate the measurement cycle. A tone-controlled solenoid valve is also provided in place of petcock 6 to permit emptying of the container. In such an arrangement only the low power consuming tone receiver need be continually energized, thereby lowering the cost of use and lengthening the life of the remainder of the equipment. Moreover with this arrangement, no human attention is required at the measurement site and instruments may be placed and operated in locations unsuitable for human habitation. Such radio remote control apparatus for operating relays is well known and is not shown.

By mounting the invention on a piling or other support fixed to a river or lake bottom, it may be used to indicate the level of such bodies of water. In such case, holes (not shown) would be provided in container 2 or the bottom removed to permit entry of water and the unit would be so positioned that the mean water level is at the mid-point of the probe path. All electrical equipment would be suitably waterproofed or, alternatively, re-located so as to be above the maximum water level.

To permit operation of the device during freezing weather and to permit measurement of frozen precipitation (hail, snow, etc.), heaters (not shown) may be provided in the container. In one possible arrangement, two heaters are used, one around the top of the container and the other installed vertically inside the collector can from top to bottom. These heaters may be thermostatically controlled to maintain a 32° F. to 35° F. temperature within the container. This has been found adequate to maintain the precipitation in a liquid state without causing excessive evaporation.

The invention having been described in what is considered to be a preferred embodiment thereof, it is to be understood that the specific details shown are merely illustrative and that various modifications and changes may be made without departing from its spirit and scope.

Having thus described my invention, what I claim as new and wish to secure by Letters Patent is:

1. A liquid level measuring device comprising, a container for holding liquid, a conductive contact element, reversible motor drive means for moving said contact element along a vertical path interiorly of said container, an identification motor, first switch means for actuating said identification motor, second switch means operated by said identification motor, pulse-generating means responsive to operation of said second switch means to generate a first series of pulses, means operated by said identification motor to render said motor drive means operable to move said contact element towards said liquid, third switch means operative during movement of said contact element towards said liquid to cause said pulse-generator to generate a train of periodic pulses, and fourth switch means responsive to contact between said contact element and said liquid to render said pulse-generator inoperative and to reverse the direction of operation of said motor drive means.

2. The apparatus as claimed in claim 1, further comprising a fifth switch means responsive to completion of a predetermined amount of downward travel of said contact element to render said pulse-generating means inoperative and to reverse the direction of operation of said motor drive means.

3. In a liquid level measuring device, a container for holding said liquid, a conductive probe, reversible motor drive means for moving said probe along a vertical path interiorly of said container, first switch means to actuate said motor drive means to move said probe downward along its vertical path from a reference position, pulse-generating means, second switch means responsive to downward travel of said probe to cause said pulse-generating means to produce a train of pulses, a normally non-conducting electron discharge device, means responsive to contact between said probe and the surface of the liquid within said container to initiate conduction through said device, electromagnetic means responsive to conduction through said device to render said pulse-generating means inoperative and to reverse the direction of the probe travel, and third switch means operative upon return of said probe to its reference position to render said electron discharge device nonconducting and said motor drive means inoperative.

4. A liquid level measuring device comprising, a conductive probe, a container for the liquid whose level is to be measured, means for driving said probe interiorly of said container towards the surface of said liquid, pulse-generating means responsive to movement of said probe towards said liquid for producing a train of uniformly spaced pulses, each said pulse representing a predetermined amount of movement of said probe, an electron discharge device having a cathode, control grid, and anode, circuit means connecting said probe to said control grid, means supplying operating potential to said anode, biassing means connected to said cathode to render said tube normally nonconducting, circuit means responsive to contact between said probe and said liquid to render said electron discharge device conducting, and electromagnetic switch means connected to said anode and responsive to conduction of said device to render said pulse-generating means inoperative and to withdraw said probe from said liquid surface.

5. A liquid level measuring device comprising, a container for liquid, a first threaded shaft mounted vertically within said container, a first follower nut threadedly engaging said shaft, a conductive probe mounted on said first follower nut, a second threaded shaft disposed parallel to said first shaft exteriorly of said container, a second follower nut threadedly engaging said second shaft, reversible motor drive means for rotating both said shafts simultaneously, first and second pulse-generating means, first switch means for causing said first pulse-generating means to generate a first pulse, motor means responsive to actuation of said first switch means for causing said second pulse-generating means to generate a first train of pulses, second switch means actuated by said motor means for causing said first pulse-generating means to generate a second pulse at the termination of said first train of pulses, third switch means responsive to operation of said motor means to render said reversible motor drive means operable to drive said probe and said follower nuts towards the surface of said liquid, fourth switch means for rendering said second pulse generator operative, means coupled to said motor drive means for periodically actuating said fourth switch means during travel of said probe towards said liquid to generate a second train of pusles, a fifth switch means comprising a gas-filled electron discharge device, means responsive to contact between said probe and said liquid for actuating said fifth switch means, means responsive to actuation of said fifth switch means for reversing the direction of said motor drive means and for rendering said second pulse generator means inoperative, sixth switch means operated by said second follower nut upon its return to its initial position for rendering said first pulse generating means operative to generate a third pulse and for rendering said motor drive means inoperable, and means to transmit said pulses and pulse trains to a remote receiver.

6. The arrangement of claim 5 further comprising a seventh switch means operative upon completion of a predetermined amount of travel of said probe toward said liquid to render said second pulse-generating means inoperative and for reversing the direction of said motor drive means.

7. A portable precipitation measuring device comprising a substantially flat base member, a container mounted on said base member having an open upper end for catching and holding precipitation, a support frame affixed to said container exteriorly thereof, a conductive probe, reversible motor drive means mounted on said frame for moving said probe along a vertical path interiorly of said container, first switch means to actuate said motor drive means to move said probe downward along its vertical path from a reference position, pulse generating means, second switch means operative in response to travel of said probe to cause said pulse generating means to produce a train of pulses, means responsive to contact between said probe and the surface of the precipitation collected within said container to render said pulse generating means inoperative and to reverse the direction of the probe travel, third switch means operative upon return of said probe to its reference position to render said motor drive inoperative and a fourth switch means operative upon completion of a predetermined amount of downward travel of said probe to render said pulse generating means inoperative and to reverse the direction of probe travel for returning said probe to its reference position in the event that no precipitation has been collected in said container.

References Cited in the file of this patent

UNITED STATES PATENTS

| | | |
|---|---|---|
| 756,109 | Friez | Mar. 29, 1904 |
| 1,611,407 | Berg | Dec. 21, 1926 |
| 1,664,265 | Rieber | Mar. 27, 1928 |
| 1,760,609 | Rowan et al. | May 27, 1930 |
| 2,497,759 | Cappleman | Feb. 14, 1950 |
| 2,628,428 | Politsch | Feb. 17, 1953 |

FOREIGN PATENTS

| | | |
|---|---|---|
| 1,088,196 | France | Sept. 8, 1954 |